United States Patent
Herman

(10) Patent No.: US 9,897,806 B2
(45) Date of Patent: *Feb. 20, 2018

(54) GENERATION OF THREE-DIMENSIONAL IMAGERY TO SUPPLEMENT EXISTING CONTENT

(71) Applicant: DreamWorks Animation LLC, Glendale, CA (US)

(72) Inventor: Brad Kenneth Herman, Culver City, CA (US)

(73) Assignee: DREAMWORKS ANIMATION L.L.C., Glendale, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/618,990

(22) Filed: Feb. 10, 2015

(65) Prior Publication Data

US 2016/0232706 A1 Aug. 11, 2016

(51) Int. Cl.
*G06T 15/20* (2011.01)
*G02B 27/01* (2006.01)
(Continued)

(52) U.S. Cl.
CPC .......... *G02B 27/017* (2013.01); *G06T 15/205* (2013.01); *G06T 17/20* (2013.01);
(Continued)

(58) Field of Classification Search
CPC .............. G06T 19/006; H04N 13/004; H04N 13/0275; G06F 3/01; G06F 3/033; G02B 27/017
See application file for complete search history.

(56) References Cited

U.S. PATENT DOCUMENTS

| | | |
|---|---|---|
| 5,287,437 A | 2/1994 | Deering |
| 5,812,269 A | 9/1998 | Svetkoff et al. |

(Continued)

FOREIGN PATENT DOCUMENTS

| | | |
|---|---|---|
| EP | 2568439 A2 | 3/2013 |
| WO | 1994/016406 A1 | 7/1994 |

(Continued)

OTHER PUBLICATIONS

Stenicke et al. "Interscopic User Interface Concepts for Fish Tank Virtual Reality Systems", IEEE Virtual Reality Conference Mar. 10-14, 2007 Charlotte, North Carolina, USA.*
(Continued)

*Primary Examiner* — Saptarshi Mazumder
(74) *Attorney, Agent, or Firm* — Dentons US LLP

(57) ABSTRACT

A computer-implemented process for generating stereoscopic images to supplement existing content includes obtaining first image data and obtaining second image data comprising a plurality of sample points. A direction, a color value, and a depth value are associated with each sample point. The direction and depth values are relative to a common origin. A mesh is generated such that the mesh is displaced from the origin in the directions associated with the sample points by distances representative of the corresponding depth values. The second image data is mapped to the mesh such that the color values associated with the sample points are mapped to the mesh at the corresponding directions. First and second stereoscopic images of the mesh are generated from first and second perspectives, respectively. The first image data is caused to be displayed on a first portion of a display. At least part of both the first stereoscopic image and the second stereoscopic image is caused to be displayed on a second portion of the display. At least part (Continued)

of the second portion of the display does not overlap the first portion of the display.

34 Claims, 12 Drawing Sheets

(51) Int. Cl.
*G06T 17/20* (2006.01)
*H04N 13/02* (2006.01)
*H04N 13/04* (2006.01)
*G06F 3/01* (2006.01)

(52) U.S. Cl.
CPC ....... *H04N 13/0278* (2013.01); *H04N 13/044* (2013.01); *G06F 3/01* (2013.01); *G06T 2215/16* (2013.01)

(56) References Cited

U.S. PATENT DOCUMENTS

| | | | | |
|---|---|---|---|---|
| 6,157,424 | A | * | 12/2000 | Eichenlaub ........ G02B 27/2214 348/E13.022 |
| 2004/0032980 | A1 | | 2/2004 | Harman |
| 2004/0184655 | A1 | | 9/2004 | Ziegler et al. |
| 2005/0190180 | A1 | | 9/2005 | Jin et al. |
| 2006/0036756 | A1 | | 2/2006 | Driemeyer et al. |
| 2008/0135748 | A1 | | 6/2008 | Daimon et al. |
| 2008/0143709 | A1 | | 6/2008 | Fassero et al. |
| 2009/0100379 | A1 | | 4/2009 | Borchers et al. |
| 2010/0054579 | A1 | | 3/2010 | Okutomi et al. |
| 2010/0134486 | A1 | | 6/2010 | Colleen |
| 2011/0074770 | A1 | * | 3/2011 | Robinson ................ G06T 15/20 345/419 |
| 2011/0109617 | A1 | * | 5/2011 | Snook .................... G06T 17/00 345/419 |
| 2011/0249122 | A1 | * | 10/2011 | Tricoukes ............ G02B 27/017 348/158 |
| 2011/0254841 | A1 | | 10/2011 | Lim et al. |
| 2012/0176409 | A1 | * | 7/2012 | Noge ................. H04N 13/0022 345/633 |
| 2012/0182403 | A1 | | 7/2012 | Lange |
| 2012/0212509 | A1 | * | 8/2012 | Benko .................... G03B 35/00 345/633 |
| 2012/0320169 | A1 | | 12/2012 | Bathiche |
| 2013/0050185 | A1 | | 2/2013 | Xie et al. |
| 2013/0258062 | A1 | | 10/2013 | Noh et al. |
| 2015/0312560 | A1 | * | 10/2015 | Deering ............. G02B 13/0085 345/1.3 |

FOREIGN PATENT DOCUMENTS

| | | |
|---|---|---|
| WO | 1998/009445 A1 | 3/1998 |
| WO | 2003/034705 A2 | 4/2003 |
| WO | 2012/166593 A2 | 12/2012 |

OTHER PUBLICATIONS

Ainsworth et al. "Acquisition of stereo panoramas for display in VR environments", Proc. SPIE 7864, Three-Dimensional Imaging, Interaction, and Measurement, 786416 (Jan. 27, 2011); doi:10.1117/12.872521.*

Wildermuth et al. "Patient Specific Surgical Simulation System for Procedures in Colonoscopy", Stuttgart, Germany, Nov. 21-23, 2001.*

Oliveira, Manuel M., "Relaxed Cone Stepping for Relief Mapping", Fabio Policarpo Perpetual Entertainment, GPU Gems 3, Available at <http://http.developer.nvidia.com/GPUGems3/gpugems3_ch18.html>, Retrieved on Feb. 18, 2015, 19 pages.

Extended European Search Report (includes Partial European Search Report and Search Opinion) received for European Patent Application No. 16154613.0, dated May 17, 2016, 10 pages.

Extended European Search Report (includes Partial European Search Report and European Search Opinion) received for European Patent Application No. 16154616.3, dated Jun. 13, 2016, 10 pages.

Meine et al., "A New Sub-pixel Map for Image Analysis", Lecture Notes In Computer Science, vol. 4040, 2006, pp. 116-130.

Non-Final Office Action received for U.S. Appl. No. 14/618,981, dated Sep. 2, 2016, 23 pages.

Felinto et al., "Production Framework for Full Panoramic Scenes with Photorealistic Augmented Reality", CLEI Electronic Journal, vol. 16, No. 3, Dec. 2013, pp. 1-18.

Kim et al., "3D Scene Reconstruction from Multiple Spherical Stereo Pairs", International journal of computer vision, vol. 104, No. 01, 2013, pp. 94-116.

Notice of Allowance received for U.S. Appl. No. 14/618,981, dated Mar. 22, 2017, 10 pages.

\* cited by examiner

GENERATION OF THREE-DIMENSIONAL IMAGERY TO SUPPLEMENT EXISTING CONTENT

BACKGROUND

1. Field

This application relates generally to generating imagery to supplement existing visual content, and more specifically, to processes and systems for generating three-dimensional (3D) imagery that supplements other two-dimensional (2D) or 3D imagery.

2. Related Art

Stereoscopic images are 2D images that create the illusion of 3D depth. Each stereoscopic image provides a view of a scene from a slightly different perspective. 3D depth is perceived when different images are displayed to a viewer in a way such that each eye sees a different view of the scene.

One way to produce 3D imagery of a live scene is to use a 3D camera, stereo camera, or the like, having two or more lenses each with a separate image sensor that captures an image of the scene from a slightly different perspective. FIG. 1 depicts an exemplary 3D camera 100 with two lenses 102 and 104. Similar to an observer's eyes, the lenses 102, 104 point in the same direction but are offset from one another to provide two different perspectives of the photographed scene.

It is also possible to create 3D images of a computer-generated environment. Computer-generated environments are typically created using geometric models of objects (e.g., trees, rocks, clouds, etc.) and characters (e.g., animals, people, etc.). The geometric models may be combined with other data, such as textures, colors, lighting, and the like, in a rendering process to produce animated images of the computer-generated environment, such as the one shown in FIG. 2. Similar to live scenes, images of the computer-generated environment may be rendered from slightly different perspectives and displayed to provide the illusion of 3D depth.

Traditionally, producing realistic 3D imagery requires that the actual scene (real or computer-generated) be imaged from at least two different perspectives. Live or computer-generated scenes that were not originally imaged from multiple perspectives could not be used to produce quality 3D imagery of the scene.

Thus, there is an opportunity to improve techniques for generating 3D imagery of real and computer-generated scenes.

SUMMARY

In one embodiment, a computer-implemented process for generating stereoscopic images to supplement existing content includes obtaining first image data and obtaining second image data comprising a plurality of sample points. A direction, a color value, and a depth value are associated with each sample point. The direction and depth values are relative to a common origin. A mesh is generated such that the mesh is displaced from the origin in the directions associated with the sample points by distances representative of the corresponding depth values. The second image data is mapped to the mesh such that the color values associated with the sample points are mapped to the mesh at the corresponding directions. First and second stereoscopic images of the mesh are generated from first and second perspectives, respectively. The first image data is caused to be displayed on a first portion of a display. At least part of both the first stereoscopic image and the second stereoscopic image is caused to be displayed on a second portion of the display. At least part of the second portion of the display does not overlap the first portion of the display.

In one embodiment, the display of the first and second stereoscopic images creates an illusion of depth. The first image data and the first and second images may be displayed on a head-mounted display.

In one embodiment, the second image data is tessellated. Tessellating the second image data creates a plurality of vertices. The vertices are used as the sample points for generating the mesh, mapping the image data to the mesh, and generating the first and second stereoscopic images of the mesh. The density of vertices may be greater than a density of pixels of a display to be used to display the first and second stereoscopic images.

In one embodiment, a portion of an image represented by the second image data is determined and the obtained second image data includes only the data for the portion of the image. The portion of the image may be determined at least in part by the position of a head-mounted display.

In one embodiment, the second image data represents an image of a scene from the perspective of a vantage point. The scene may include computer-generated and/or live content. The image of the scene may include a 360 degree view horizontally around the vantage point and a 180 degree view vertically around the vantage point.

Systems and computer-readable storage media for generating stereoscopic images to supplement existing content are also described.

BRIEF DESCRIPTION OF THE FIGURES

The present application can be best understood by reference to the following description taken in conjunction with the accompanying figures, in which like parts may be referred to by like numerals.

DETAILED DESCRIPTION

Figure 1:
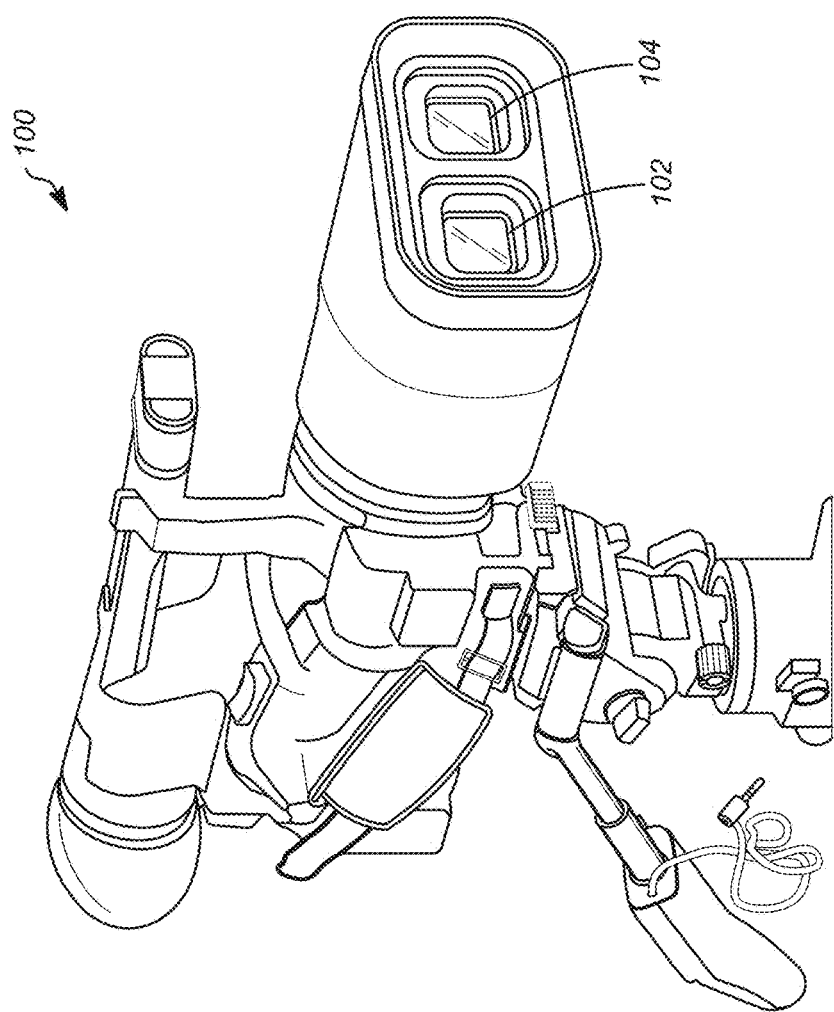
FIG. 1 illustrates an exemplary camera for capturing 3D images.
Figure 2:
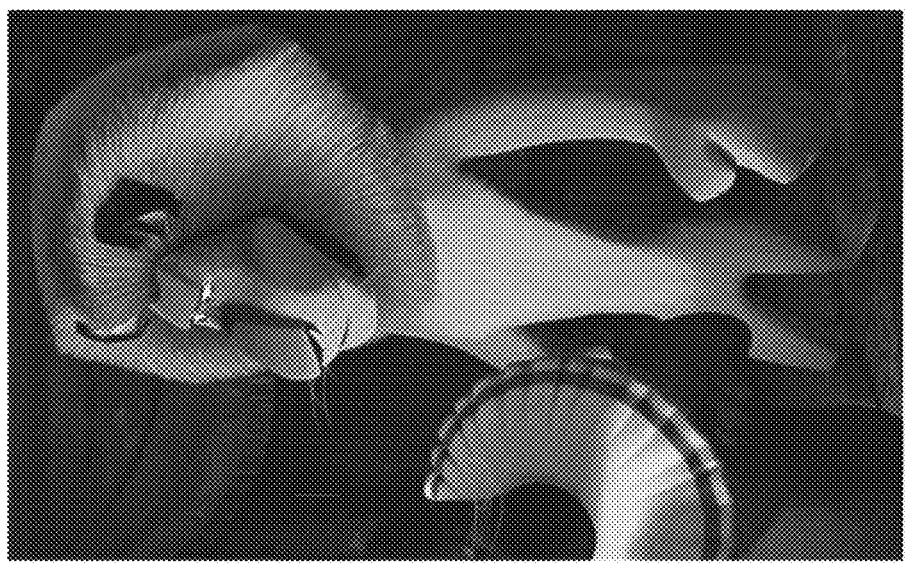
FIG. 2 illustrates an exemplary computer-generated image.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Various examples are described below relating to techniques for generating 3D imagery. The processes may allow for the perception of depth to be created without having to capture or render true 3D imagery. In some embodiments, a 2D image is mapped to a 3D mesh that is generated using depth information associated with the image. The image mapped to the 3D mesh is re-imaged from two different perspectives to produce stereoscopic images that can be displayed to create the illusion of 3D depth. See also co-pending U.S. patent application Ser. No. 14/618,981, titled "Generation of Three-dimensional Imagery From a Two-dimensional Image Using a Depth Map," filed Feb. 10, 2015 by Herman, which is incorporated by reference in its entirety for all purposes.

This technique may be used to generate content (e.g., 3D imagery) that supplements existing content. Existing content includes images, movies, motion pictures, TV shows, videos, animations, or the like, that is created separately from the supplemental content. Existing content may include content that was previously created, perhaps years ago. The existing content may be 2D or 3D imagery. Supplemental 2D and/or 3D content can be generated for display along with existing content to enhance the viewing experience of the existing content. For example, the supplemental content may include additional effects, features, and/or images of a surrounding environment associated with the existing content. The supplemental content can be displayed on top of (e.g., in front of) and/or around the existing content.

In some examples, the supplemental content provides a surrounding environment for an existing motion picture, movie, animation, or the like. Existing content often includes only a limited field of view of a scene captured by a camera. The supplemental content may provide a real or fictional representation of the surrounding environment outside the field of view of the camera at the time the scene was originally captured. For example, the supplemental content may include live images, obtained at a later time, of the location of the scene. The images of the surrounding environment may be displayed along with the existing content to create a more immersive viewing experience for the viewer. In some examples, the supplemental content includes computer-generated content of a real or virtual surrounding environment. The supplemental content can also include a combination of real and computer-generated imagery.

In other examples, the supplemental content is added around the existing content to create a visual effect. For example, the supplemental content may be used to soften the transition at the edges of the existing content and/or create a framing effect.

The existing and supplemental content may be projected or displayed in various ways. In some examples, stereoscopic images of the existing and/or supplemental content are projected onto a screen and are overlapped for viewing through 3D glasses, as is done in theaters for example. In other examples, a head-mounted display, such as a virtual reality headset, may be used. The headset may include displays and optics that present a different image to each eye.

Figure 3B:
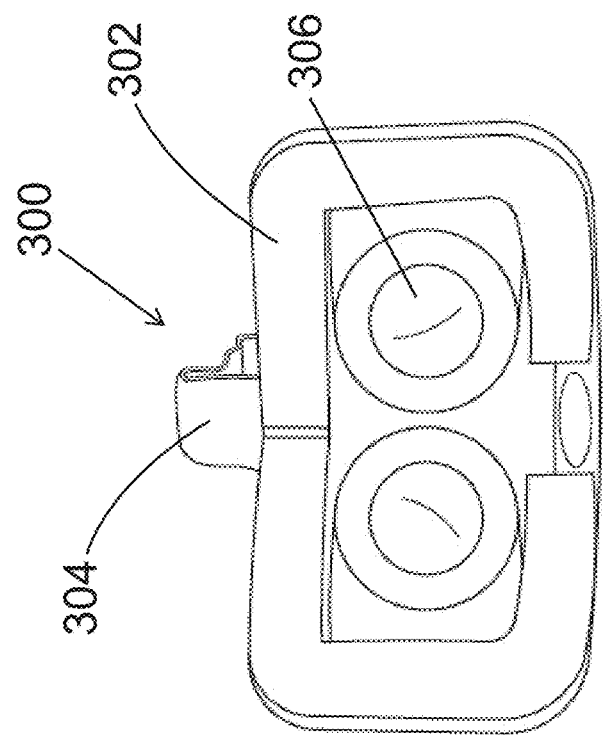
FIGS. 3A-3B illustrate an exemplary virtual reality headset.
Figure 3A:
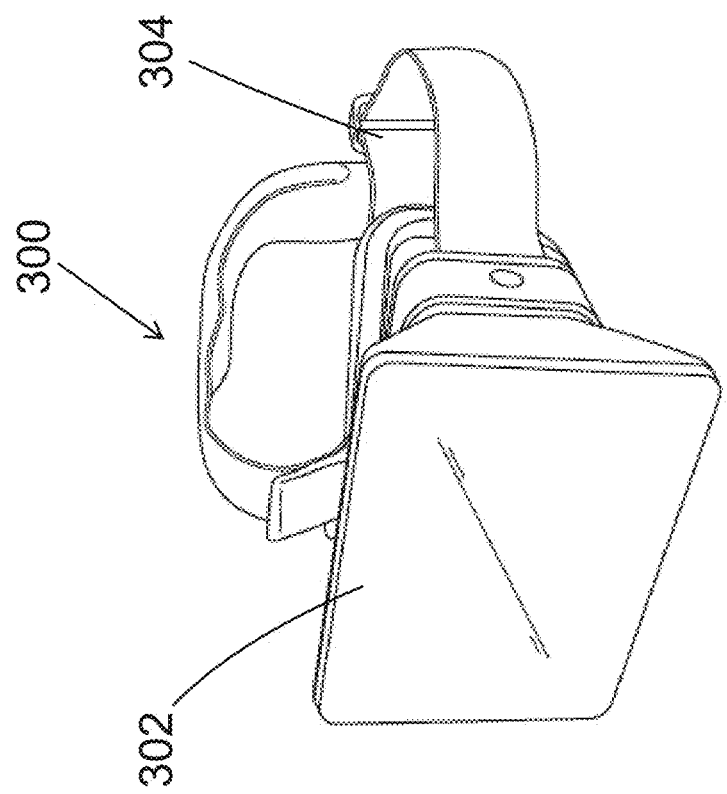

FIGS. 3A-3B depict an exemplary virtual reality headset 300 that may be used to display 3D imagery. The headset 300 includes a display/sensor portion 302 and straps 304 to secure the headset 300 to a user's head. The display/sensor portion 302 includes a display unit that generates a two-dimensional image for each eye. The images may be displayed by projecting the image onto a miniaturized screen in the headset 300. In some embodiments, the display unit includes a CRT, LEDs, LCDs, or the like. Optics may be used to manipulate and condition the light from the display. As seen in FIG. 3B, for example, the headset 300 includes binocular optics 306 for viewing the display.

The headset 300 may also include a motion-sensing unit that includes sensors, such as, for example, gyroscopes, accelerometers, or the like, to detect and track movement of the user's head. As a user's head physically moves, the motion sensors in headset 300 may detect the movement and alter the user's view. For example, when a user turns his head to the right, the headset displays an image to the right of the previous view. Accordingly, the user may "look around" an environment provided by the supplemental content simply by moving his head the same way as he would look around the real world.

Exemplary techniques for generating 3D imagery from supplemental content will now be described with reference to FIGS. 4-9.

Figure 4:
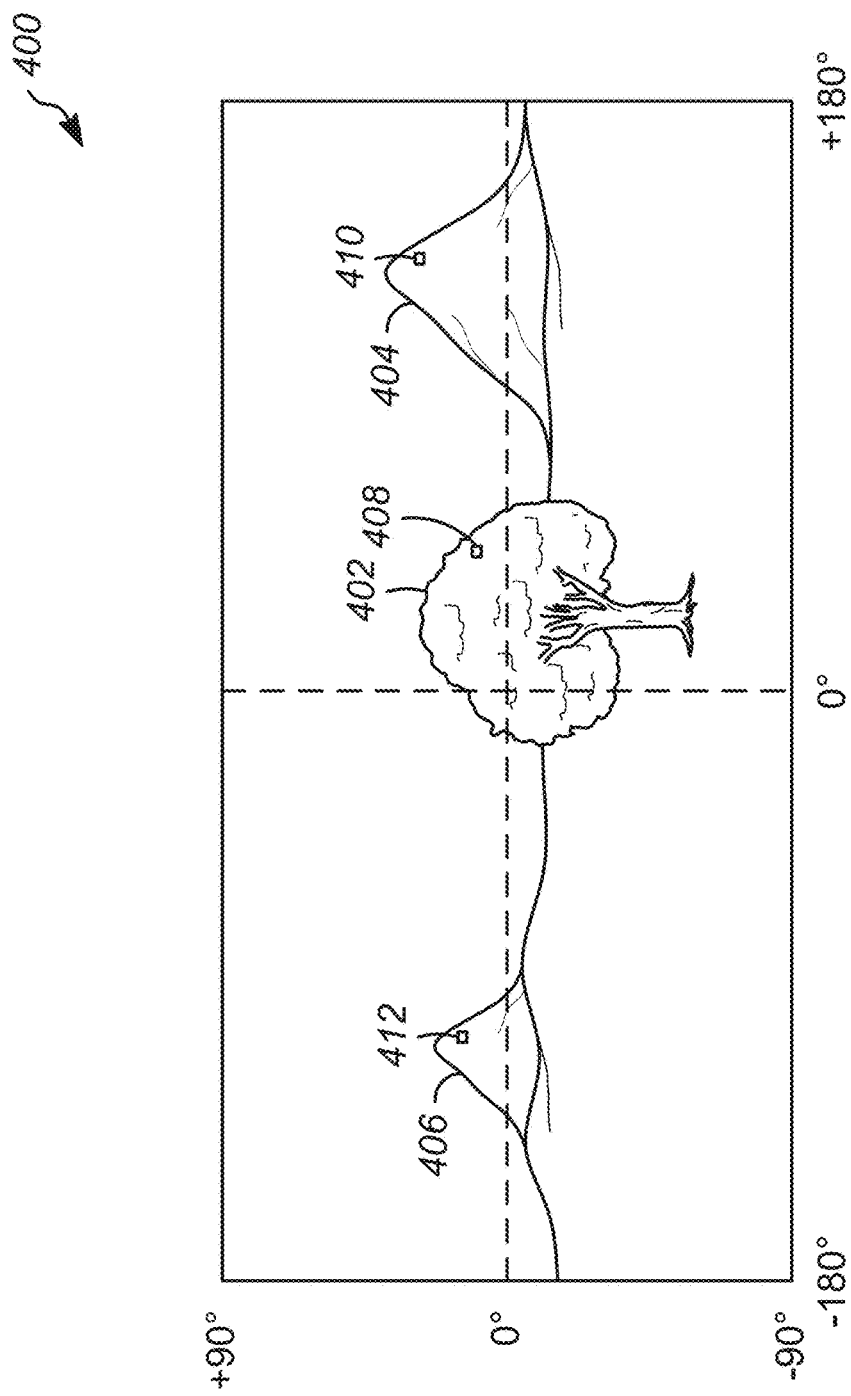
FIG. 4 illustrates an exemplary 2D image of a scene.

FIG. 4 depicts an exemplary 2D image 400 of a live scene that includes a tree 402 and two hills 404 and 406. In one embodiment, the landscape in image 400 is similar to or a replica of a setting in a scene of an existing movie. Image 400 may be supplemental content that is captured for the purpose of adding a surrounding environment to the existing movie.

The image 400 shows a 360 degree horizontal by 180 degree vertical (360×180) view around a vantage point. A 360×180 image of a live scene may be captured using six 90 degree field-of-view cameras oriented in a cube configuration (i.e., one camera facing perpendicularly away from each face of the cube). However, it should be appreciated that various other camera and lens configurations may be used to capture the image.

In other examples, the image may be completely computer-generated or may include both real and computer-generated content. Also, while the example provided in FIG. 4 describes a full 360×180 view of a scene, it should be appreciated that the image may include less than the entire view of the scene surrounding the vantage point.

The image 400 can be represented by image data containing a plurality of sample points or pixels (e.g., a digital image). Each pixel may be associated with a color value (e.g., in RGB format) and a direction relative to the location from which the image was captured or rendered. Color values may also include grey-scale values.

Each pixel is also associated with a depth value. The depth value represents a distance from the vantage point to the portion of the scene at the pixel. For example, in FIG. 4, pixel 408 on the tree is located approximately 30 degrees in the horizontal direction, approximately 15 degrees in the vertical direction, and has a depth value of 10. Pixel 410 on the hill on the right side of the image is located approximately 110 degrees in the horizontal direction, approximately 35 degrees in the vertical direction, and has a depth value of 20. Pixel 412 on the hill on the left side of the image is located approximately −100 degrees in the horizontal direction, approximately 20 degrees in the vertical direction, and has a depth value of 50.

The depth values may be generated in various ways. For an image of a live scene, a depth camera may be used to measure the depths of objects while capturing images of the scene (i.e., the distance from the camera to an object or a point on an object). Depth data may also be generated after the image has been captured. For example, an algorithm may be used to estimate the depths of objects in the scene based on the field-of-view of the image, the size of objects relative to an object of known size, or other factors. Alternatively, depth values may be assigned manually. Depth values may also be altered from their measured or estimated values for artistic reasons, to create, emphasize, or minimize certain effects.

For computer-generated images, depth values may be determined directly from the 3D computerized model from which the image is rendered. Alternatively, depth values may be assigned manually or using an algorithm as discussed above with regard to live scenes.

Figure 5:
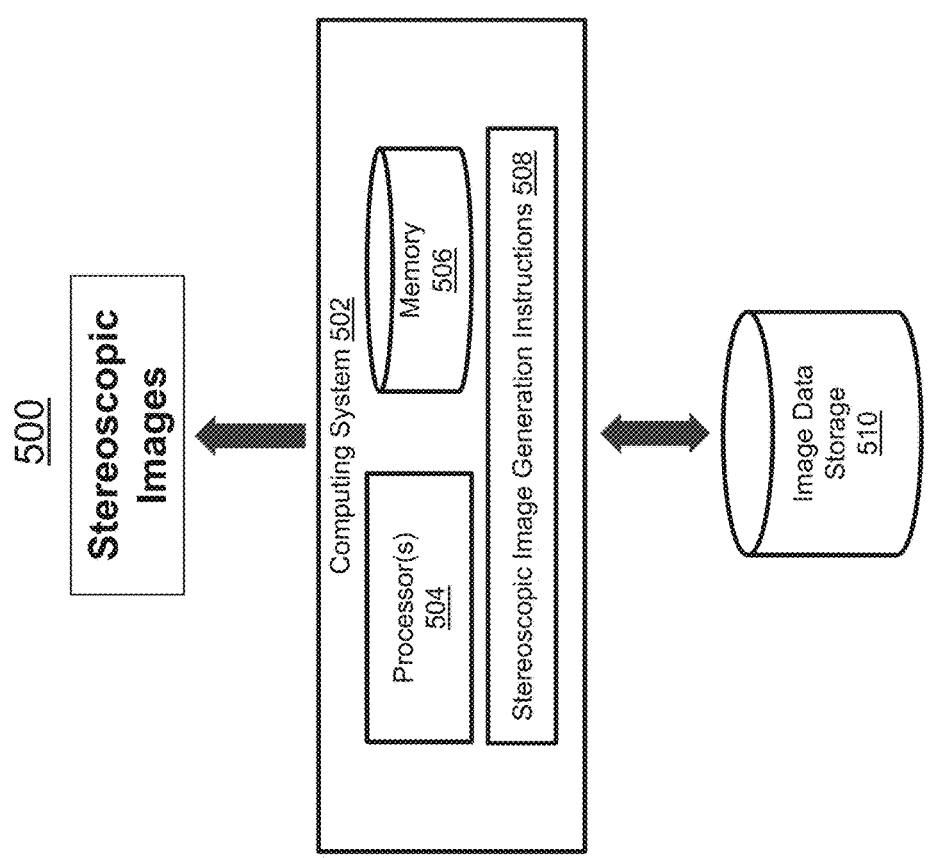
FIG. 5 illustrates an exemplary stereoscopic image generation system.

FIG. 5 illustrates an exemplary stereoscopic image generation system 500 that may be used to create stereoscopic images of a scene similar to that of FIG. 4. Stereoscopic image generation system 500 may be implemented using computing system 502 having one or more processors 504 for executing stereoscopic image generation instructions 508 stored on a non-transitory computer-readable storage medium of computing system 502. Computing system 502 may further include memory 506 for storing image data from image data storage 510. The image data may include previously captured images or video. The images may be of a live scene or a rendered computer-generated scene. Memory 506 may also be configured to store data created while executing stereoscopic image generation instructions 508. As discussed in greater detail below, stereoscopic image generation system 500 may be used to create stereoscopic images to create the illusion of depth from a 2D image.

While image data storage 510 is shown as being a separate database that is separate from computing system 502, it should be appreciated that image data storage 510 may instead be implemented using a single storage device that is local or remote to computing system 502.

Figure 6:
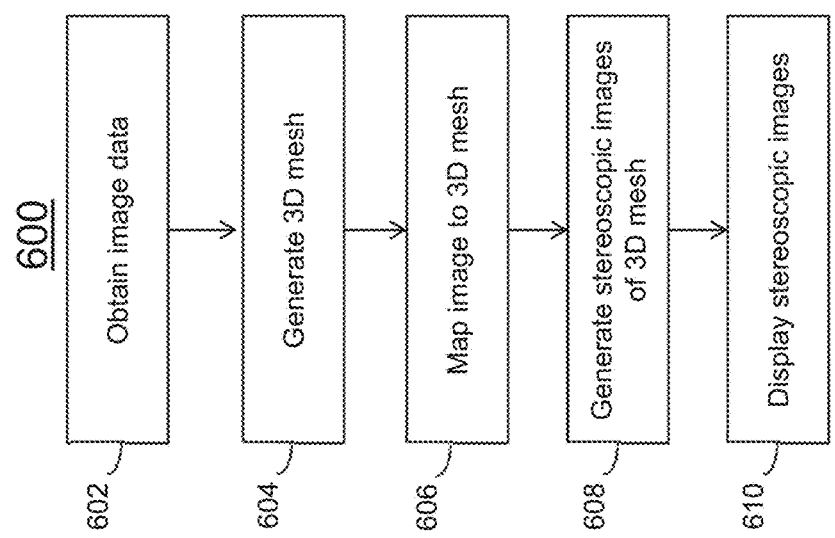
FIG. 6 illustrates an exemplary process for generating stereoscopic images.

FIG. 6 illustrates an exemplary process 600 for creating stereoscopic images of supplemental content, such as image 400 discussed above. While specific steps and operations of process 600 are discussed in a particular order, it should be recognized that the processes described below are merely exemplary and do not exclude the possibility of performing additional steps, performing a subset of the described steps (or portions thereof), or performing the described steps in an alternative order.

Figure 7:
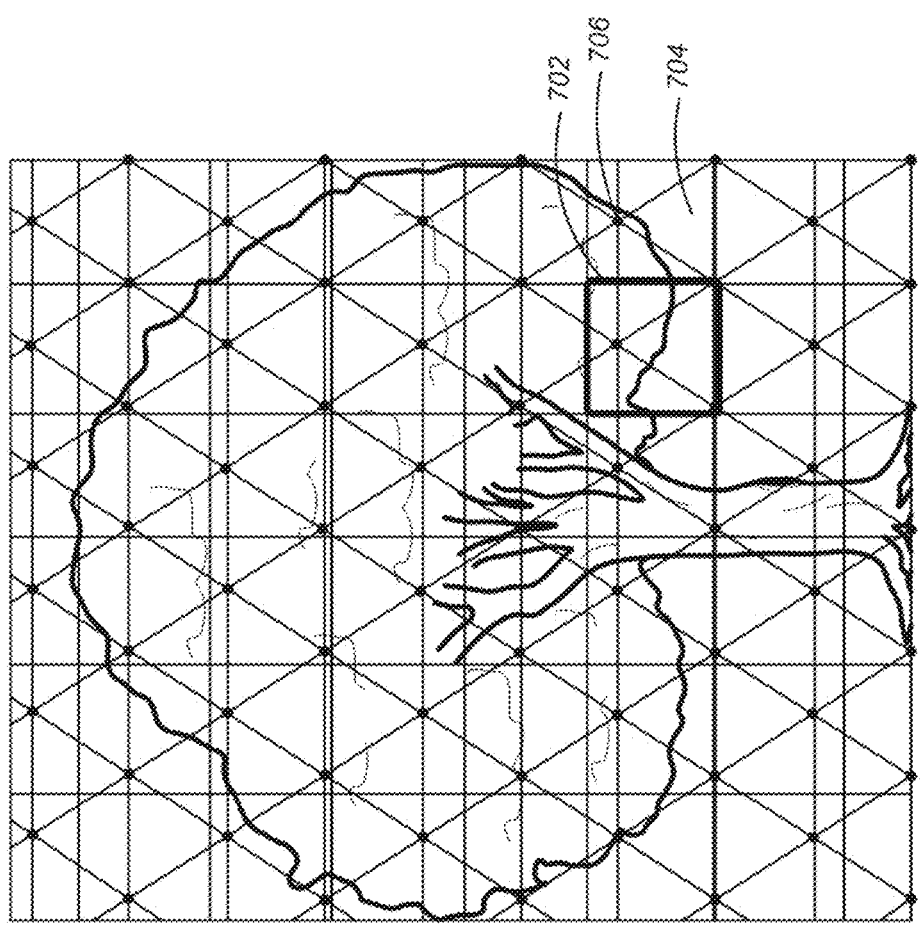
FIG. 7 illustrates an exemplary portion of a tessellated image.

At block 602, image data is obtained. The image data may include a digital image with a direction, color value, and depth value associated with each pixel in the image. Optionally, the image data is tessellated. Tessellation divides the image into smaller regions (typically polygons) defined by line segments that meet at vertices. FIG. 7 depicts an exemplary portion of the image 400 from FIG. 4 that has been tessellated. In FIG. 7, the portion of image 400 is represented by square pixels identified by the dashed lines. Exemplary pixel 702 is outlined in bold. The image has been tessellated into triangles 704 defined by vertices 706. In some examples, it may be advantageous to tessellate the image such that the vertices form regions (e.g., polygons) of equal area when projected onto a sphere in their corresponding directions.

The direction, color, and depth values associated with a vertex may be interpolated from the values of the pixels surrounding the vertex. Tessellation may be performed to increase the sampling of the image beyond the resolution of the display that will be used to display the 3D imagery. For example, the image may be tessellated until the density of vertices is greater than the pixel density of the display (i.e., the number of vertices exceeds the number of pixels in the display). In some examples, it may be possible to use the existing pixels as the vertices if, for example, the resolution of the obtained image is already greater than the resolution of the display.

Figure 8B:
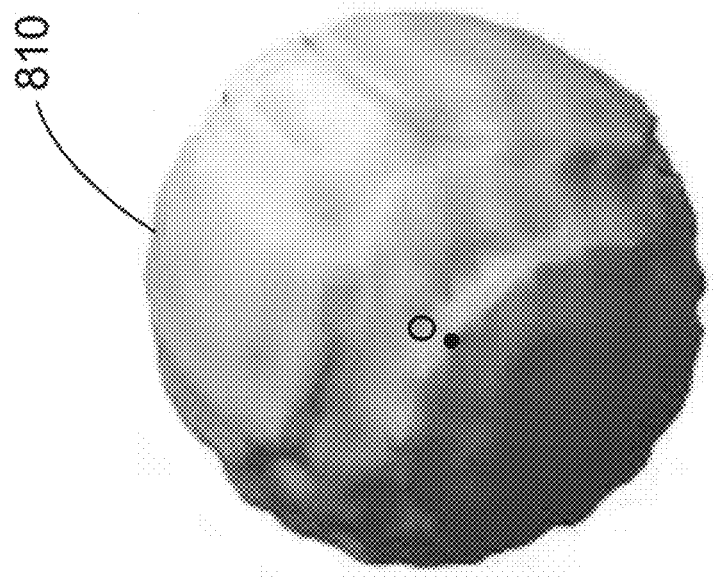
FIG. 8B illustrates an exemplary 3D mesh.
Figure 8A:
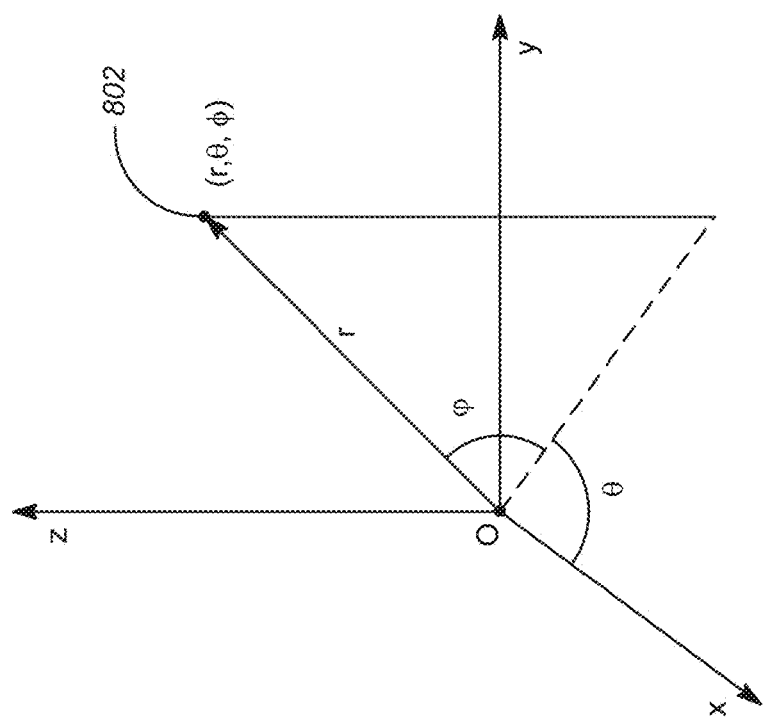
FIG. 8A illustrates an exemplary reference frame for a mesh.

Returning to FIG. 6, at block 604, a 3D mesh is generated. The mesh is generated by displacing the vertices of the tessellated image from a common origin. Each vertex is displaced in its associated direction by a distance representative of its depth value. FIG. 8A depicts an exemplary reference frame for a mesh. Vertex 802 is displaced in the direction defined by the coordinates $\theta$ in the horizontal direction and $\phi$ in the vertical direction. The vertex 802 is displaced from the origin O by the distance r, which is representative of the depth value assigned to the vertex 802. The displaced vertices create a mesh that represents a 3D scan around the vantage point from which the scene was imaged. FIG. 8B depicts an exemplary 3D mesh 810 with varying depth values that surrounds an origin O.

Figure 9:
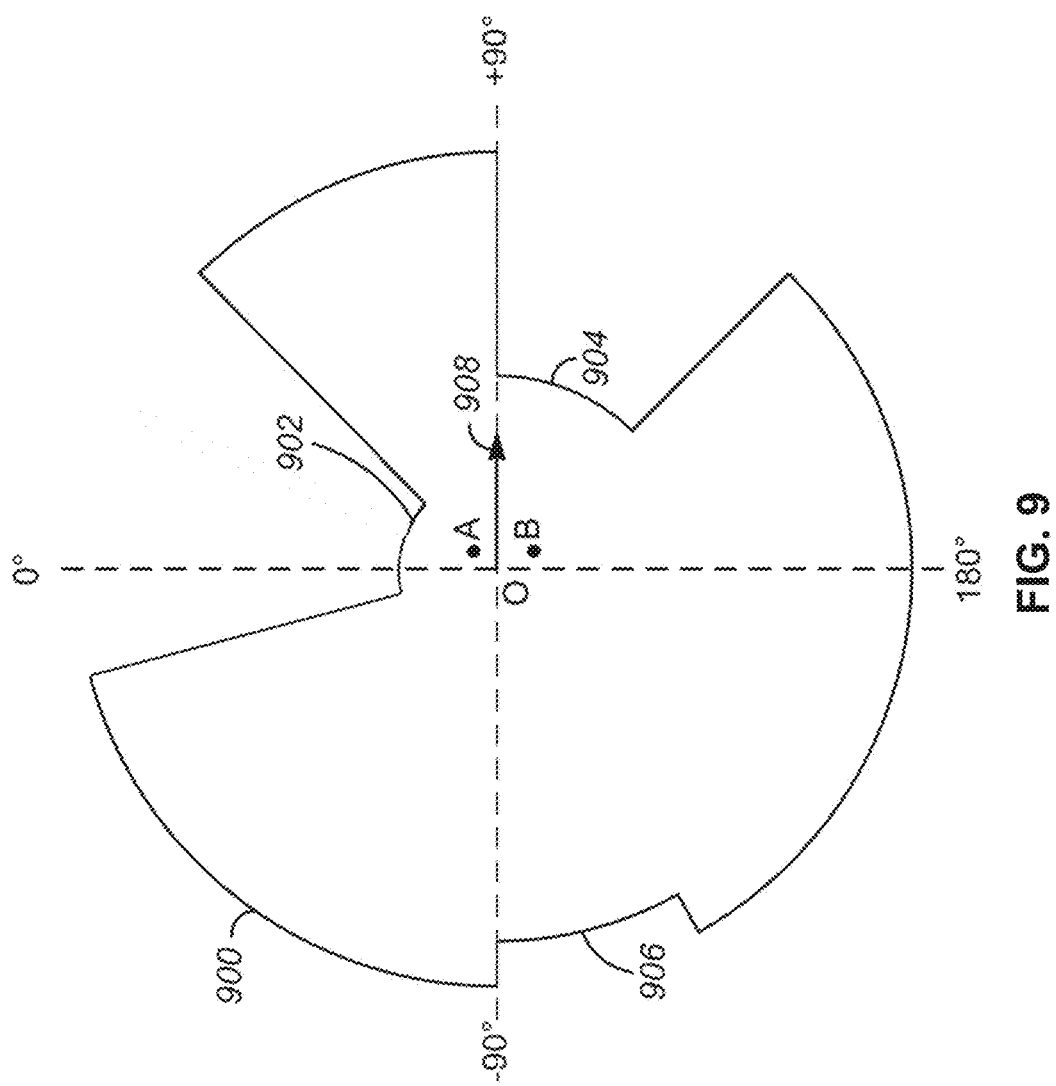
FIG. 9 illustrates a cross-section of an exemplary 3D mesh.

FIG. 9 depicts an exemplary cross-section of a mesh 900 corresponding to image 400 in FIG. 4. FIG. 9 shows a horizontal cross-section of the mesh 900 at zero degrees in the vertical direction. As shown, the distance of the mesh from the origin O varies with direction around the horizon. Features in the scene with smaller depth values are closer to the origin, while features with larger depth values are farther away. Portion 902 of the horizontal cross-section corresponds to the location of the tree 402 in image 400, and is therefore relatively close to the origin O. Portions 904 and 906 correspond to the locations of the hills 404 and 406, respectively, and therefore are farther away.

Returning again to FIG. 6, at block 606, the tessellated image is mapped onto the mesh. The color value associated with each vertex is mapped to the mesh such that the image is shown on the mesh. The colors of the regions between vertices may be determined using the colors associated with the vertices that surround the portion (e.g., by using a weighted average).

At block 608, stereoscopic images of the mesh are generated. The images are generated from at least two different perspectives to produce 2D stereoscopic images of the mapped image. Imaging the mesh may also be referred to as re-imaging the original image. The stereoscopic images may be generated from the perspectives of locations near the origin such that the images provide a view of the inner surface of the mesh. The locations from which the mesh is imaged will be discussed in greater detail below.

At block 610, the stereoscopic images of the mesh are displayed. When viewed together, the stereoscopic images of the mapped mesh create the illusion of depth in the scene shown in the original image. Any method of displaying stereoscopic images to provide the illusion of depth may be used. The display may show the entire images generated at block 608 or portions thereof. For example, only a portion of the generated images may be displayed if the angular extent of the generated images exceeds the field of view of the display.

The locations from which the mesh is imaged at block 608 may be based on the perspective of the image that is to be displayed at block 610. The locations may be chosen to simulate the views that would be observed by a person located at the vantage point from which the original image was captured. In some examples, the locations from which the mesh is imaged represent the positions of a viewer's left and right eyes based on the look direction and orientation of the viewer's head.

For example, an image of the mesh may be captured from the perspectives of each of two points adjacent to and approximately equal distance from the origin. In FIG. 9, for example, a first image is generated from the perspective of point A, and a second image is generated from the perspective of point B. Points A and B may be used when the portion of the image at 90 degrees along the horizontal direction is centered on the display and to simulate a user looking in the direction identified by arrow 908.

In some examples, process 600 is applied to only the portion of the image to be displayed. The portion of the image to be displayed may be determined and then the data corresponding to the determined portion is used as the image data in process 600. Performing process 600 on only the portion to be displayed may reduce the computational demands of the process.

For example, the field of view of a display (e.g., a projector or head-mounted display) may be limited such that only a portion of the scene can be displayed at any given time. In applications using a virtual reality headset that can detect the position and motion of a user's head, the displayed portion may be determined by the position of the virtual reality headset, which represents the position of the user's head. The view displayed to the user is determined at least in part by the direction in which the user is looking and the orientation of the user's head. In this situation, only the portion of the image in the field of view of the display in the direction the user is looking will be processed.

It should also be recognized that the images of the mesh are not true images of the live or computer-generated scene shown in the original image. Instead, they are images of a 3D representation of the scene. Accordingly, various aspects of the original image, generated mesh, stereoscopic images, and/or the steps in process 600 may be adjusted to make the displayed imagery more visually appealing, natural, and/or realistic. The images and mesh can be generated by use of data extrapolation from source content or from operator decisions. These decisions can be made in a virtual reality environment by a process similar to painting color and moving the depth around similar to a sculptor. For example, the depth values can be tuned from an accurate linear representation of object scale to a nonlinear representation in order to implement creative choices. In some examples, the thicknesses of objects can be adjusted to draw the viewer's eyes to or away from points of interest. The overall depth of the scene can be balanced for comfortable stereo viewing and to enhance the dramatic effect of the 3D imagery. For example tree 402 in FIG. 4 could be made very thick and detailed, while hills 404 and 406 are made to be thin and distant. This may draw the viewer's eye to tree 402 as the focus point.

Furthermore, while the process 600 is described above with respect to a single image, it should be appreciated that the process may be applied to a sequence of images, such as the frames of a video, motion picture, animation, or the like. In this case, process 600 is performed on the frame (or portion thereof) corresponding to the time at which the frame is displayed.

Next, exemplary techniques for incorporating the stereoscopic images of the supplemental content with existing content, are described with reference to FIGS. 10A, 10B, and 11.

Figure 10A:
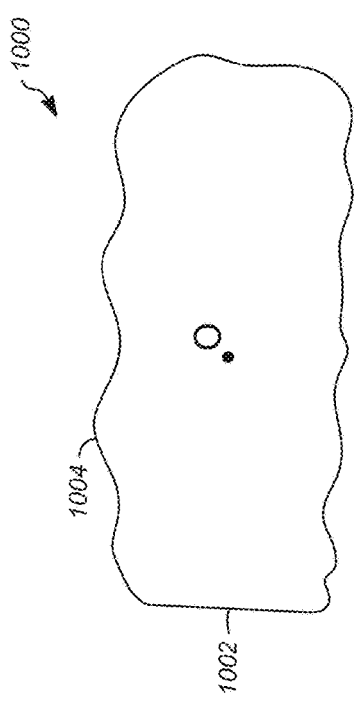
FIGS. 10A-10B illustrate cross-sections of exemplary 3D meshes.
Figure 10B:
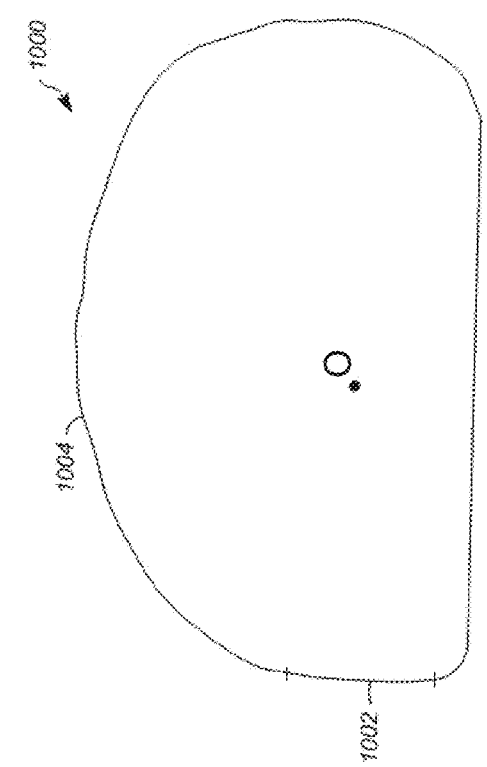

FIG. 10A depicts a vertical cross-section of a mesh 1000 that has been generated for the purpose of displaying supplemental content with existing content. The origin O provides a point of reference for determining the depth and direction of a pixel on mesh 1000, and may represent the location from which a viewer appears to view the content projected onto the mesh.

In FIG. 10A, portion 1002 of mesh 1000 corresponds to an area that includes a first image. The first image may be existing content such as a motion picture, movie, animation, or the like. For example, portion 1002 may include the image that a user would see when viewing the existing content on a theater or television screen. The mesh may be oriented such that portion 1002 is in the forward direction relative to the origin, and is displayed in front of the viewer.

In some embodiments, the existing content is mapped to the mesh 1000 at portion 1002 and reimaged to produce stereoscopic images, as in the processes described above. In some embodiments, portion 1002 is merely a placeholder that represents an area in which existing content will be located upon final display. In this case, true 2D or 3D imagery may be displayed in the area corresponding to portion 1002.

Mesh 1000 also includes portion 1004, outside of portion 1002. Portion 1004 includes supplemental content associated with the existing content displayed in portion 1002. As discussed above, a direction, depth, and color value is associated with each pixel of the supplemental content so that mesh 1000 can be generated and an image can be projected onto the mesh.

Although not shown in FIG. 10A, portion 1002 includes a movie having a scene in a confined environment such as a cave. Mesh 1000 illustrates a mesh that may be used to supplement such a scene. Notably, the impression of a low rocky ceiling is created by making the upper portion of the mesh relatively close to the origin and uneven. Similarly, the lower portion is uneven to give the impression of a rocky floor. Portion 1004 may also include an image having colors and/or content associated with the scene. For example, portion 1004 in FIG. 10A may include images of dark rocky walls to give the impression that the cave is very dark and confined. In this way, the viewer can be made to feel as though he or she is in an environment similar to the one shown in the movie.

The movie displayed on portion 1002 may also include a scene shot in an unconfined environment such as an open outdoor area. FIG. 10B provides an example of a mesh that may give the impression of being in a very open environment. The upper portion of the mesh is relatively high and rounded to represent an open sky, while the lower portion is relatively flat, which may represent a smooth ground surface. The upper portion may include, for example, an image of a light blue sky for a daytime scene, or a black sky for a nighttime scene. Similarly, images of different types of terrain (e.g., grass, dirt, pavement, etc.) may be mapped onto the lower portion of the mesh.

In some embodiments, the supplemental content on portion 1004 includes detailed or well-defined images associated with the content displayed at portion 1002. For example, the supplemental content may include details such as roads, walls, clouds, trees, rocks, buildings, or the like.

In other embodiments, the supplemental content provides a soft ambient environment with indistinct objects or no objects at all. In some embodiments, the supplemental content may create a surrounding environment that matches the general color and/or brightness of the content displayed at portion 1002. In some embodiments, the supplemental content is determined manually to achieve a desired effect.

In some embodiments, the supplemental content is generated to smooth the discontinuity that may occur at the edges of portion 1002 (e.g, the edges of the existing content). To do so, the color and/or depth of the pixels in portion 1004 that immediately surround portion 1002 may be determined based on the color and/or depth of the pixels near the edges of portion 1002. For example, the pixels of 1004 surrounding portion 1002 may match the color and/or depth of the adjacent pixels on the edge of portion 1002. In some examples, the color and/or depth of the pixels in 1004 surrounding portion 1002 are extrapolated from, or a weighted average of, the colors and/or depths of nearby pixels in portion 1002. In other examples, the color and/or depth of the pixels of 1004 surrounding portion 1002 are determined based on the average pixel color and/or depth value in portion 1002.

In some embodiments, the colors and/or depth values of the pixels in the supplemental content in portion 1004 depend on the distance of the pixel from the edge of portion 1002. For example, the color of the content surrounding portion 1002 may match the color of the existing content at the edge of portion 1002 but then transition smoothly to a particular color (e.g., black) as the distance from portion 1002 increases. In some embodiments, the depth of the mesh surrounding portion 1002 may increase gradually with the distance from the edge of portion 1002. This may create the impression that the surrounding environment gradually fades into the distance the further the surrounding is from the existing content.

In some embodiments, the supplemental content may vary over time based on changes in the environment, scene, clip, or the like, of the existing content. For example, the supplemental content may include dynamic effects and/or features corresponding to events that occur in the existing content displayed at portion 1002. In some embodiments, the perspective of the environment created by the supplemental content changes over time. In some embodiments, the supplemental content includes animated content.

Although, in the examples discussed above, the supplemental content is displayed outside of the area in which the existing content is contained, in some embodiments, a portion of the supplemental content is superimposed over a portion of the existing content. That is, a portion of the supplemental content may be displayed in portion 1002. In some embodiments, a portion of the supplemental content transitions smoothly from portion 1002 to portion 1004, or vice versa. For example, the supplemental content may include an object that is initially displayed in 3D in front of the existing content. The display of the object may then move as the object moves (e.g., a moving car or a flying bird) or as the camera pans, causing the display of the object to move relative to the direction of the camera. As the object reaches the edge of portion 1002, where the existing content cuts off, the display of the object may transition smoothly into portion 1004.

Figure 11:
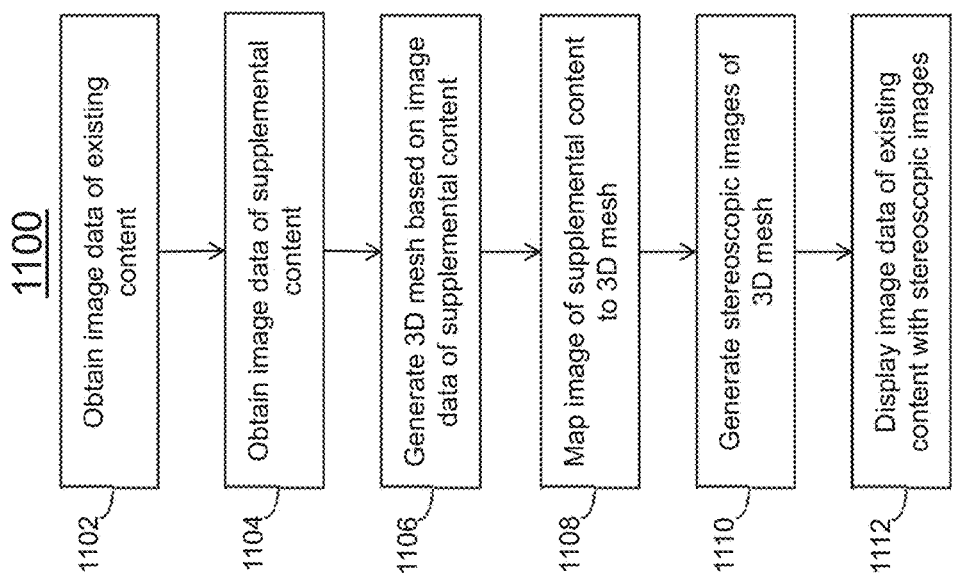
FIG. 11 illustrates an exemplary process for displaying supplemental content with existing content.

FIG. 11 illustrates an exemplary process 1100 for displaying existing content with supplemental content. While specific steps and operations of process 1100 are discussed in a particular order, it should be recognized that the processes described below are merely exemplary and do not exclude the possibility of performing additional steps, performing a subset of the described steps (or portions thereof), or performing the described steps in an alternative order. It should also be recognized that portions of process 600 described above may be incorporated into process 1100.

At block 1102, image data of existing content is obtained.

At block 1104, image data of supplemental content is obtained. The image data of the supplemental content may include a digital image with a direction, color value, and depth value associated with each pixel in the image. The image data may be tessellated as described with reference to block 604 in process 600.

At block 1106, a 3D mesh is generated from the image data of the supplemental content. The mesh may be generated as described with reference to block 606 in process 600.

At block 1108, the image of the supplemental content is mapped onto the mesh. The color value associated with each vertex is mapped to the mesh such that the image is shown on the mesh.

At block 1110, stereoscopic images of the mesh are generated. The images are generated from at least two different perspectives to produce 2D stereoscopic images of the supplemental content.

At block 1112, the stereoscopic images of the mesh representing the supplemental content are displayed along with the image data of the existing content.

Figure 12:
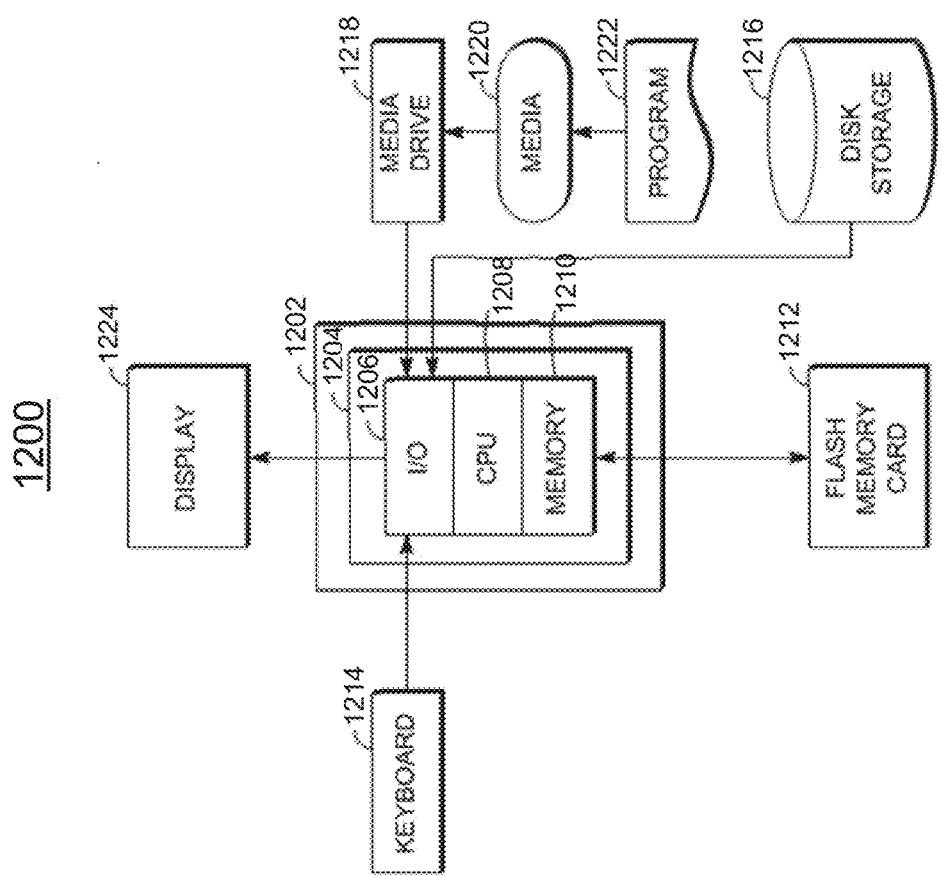
FIG. 12 illustrates an exemplary computing system.

Turning now to FIG. 12, components of an exemplary computing system 1200, configured to perform any of the above-described processes and/or operations are depicted. For example, computing system 1200 may be used to implement computing system 502 and to perform processes 600 and/or 1100. Computing system 1200 may include, for example, a processor, memory, storage, and input/output devices (e.g., monitor, keyboard, stylus, drawing device, disk drive, Internet connection, etc.). However, computing system 1200 may include circuitry or other specialized hardware for carrying out some or all aspects of the processes. In some operational settings, computing system 1200 may be configured as a system that includes one or more units, each of which is configured to carry out some aspects of the processes either in software, hardware, or some combination thereof.

In computing system 1200, the main system 1202 may include a motherboard 1204 with a bus that connects an input/output (I/O) section 1206, one or more central processing units (CPU) 1208, and a memory section 1210, which may have a flash memory card 1212 related to it. Memory section 1210 may contain computer-executable instructions and/or data for carrying out processes 600 and/or 1100. The I/O section 1206 may be connected to display 1224, a keyboard 1214, a disk storage unit 1216, and a media drive unit 1218. The media drive unit 1218 can read/write a non-transitory computer-readable storage medium 1220, which can contain programs 1222 and/or data.

Additionally, a non-transitory computer-readable storage medium can be used to store (e.g., tangibly embody) one or more computer programs for performing any one of the above-described processes by means of a computer. The computer program may be written, for example, in a general-purpose programming language (e.g., Pascal, C, C++, Java, or the like) or some specialized application-specific language.

Various exemplary embodiments are described herein. Reference is made to these examples in a non-limiting sense. They are provided to more broadly illustrate applicable aspects of the disclosed technology. Various changes may be made and equivalents may be substituted without departing from the true spirit and scope of the various embodiments. In addition, many modifications may be made to adapt a particular situation, material, composition of matter, process, process act(s), or step(s) to the objective(s), spirit, or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments.

What is claimed is:

1. A computer-implemented method for generating stereoscopic images to supplement existing content, the method comprising:
    obtaining first image data;
    obtaining second image data comprising a plurality of sample points,
        wherein a direction, a color value, and a depth value are associated with each sample point, and
        wherein the directions and depth values are relative to a common origin;
    generating a mesh, wherein generating the mesh includes displacing the sample points from the common origin in the directions associated with the sample points by distances representative of the corresponding depth values;
    mapping the second image data to the mesh, wherein the color values associated with the sample points are mapped to the mesh at the corresponding directions;
    generating a first stereoscopic image of an inner surface of the mesh from a first perspective;
    generating a second stereoscopic image of the inner surface of the mesh from a second perspective;
    causing a display of the first image data on a first portion of a display; and
    causing a display of at least part of the first stereoscopic image and at least part of the second stereoscopic image on a second portion of the display,
    wherein at least part of the second portion of the display surrounds the first portion of the display.

2. The computer-implemented method of claim 1, wherein the display of the first and second stereoscopic images creates an illusion of depth.

3. The computer-implemented method of claim 1, wherein the first image data and the first and second images are displayed on a head-mounted display.

4. The computer-implemented method of claim 1, further comprising tessellating the second image data, wherein tessellating the second image data creates a plurality of vertices, and wherein the vertices are used as the sample points for generating the mesh, mapping the image data to the mesh, and generating the first and second stereoscopic images of the inner surface of the mesh.

5. The computer-implemented method of claim 4, wherein the density of vertices is greater than a density of pixels of a display to be used to display the first and second stereoscopic images.

6. The computer-implemented method of claim 1, further comprising:
    determining a portion of an image represented by the second image data, wherein the obtained second image data includes only the data for the portion of the image.

7. The computer-implemented method of claim 6, wherein the portion of the image is determined at least in part by the position of a head-mounted display.

8. The computer-implemented method of claim 1, wherein the second image data represents an image of a scene from the perspective of a vantage point.

9. The computer-implemented method of claim 8, wherein the scene is computer-generated.

10. The computer-implemented method of claim 8, wherein the scene is a live scene.

11. The computer-implemented method of claim 8, wherein the image of the scene includes a 360 degree view horizontally around the vantage point and a 180 degree view vertically around the vantage point.

12. A non-transitory computer-readable storage medium for generating stereoscopic images, the non-transitory computer-readable storage medium comprising computer-executable instructions for:
    obtaining first image data;
    obtaining second image data comprising a plurality of sample points,
        wherein a direction, a color value, and a depth value are associated with each sample point, and
        wherein the directions and depth values are relative to a common origin;
    generating a mesh, wherein generating the mesh includes displacing the sample points from the common origin in the directions associated with the sample points by distances representative of the corresponding depth values;
    mapping the second image data to the mesh, wherein the color values associated with the sample points are mapped to the mesh at the corresponding directions;
    generating a first stereoscopic image of an inner surface of the mesh from a first perspective;
    generating a second stereoscopic image of the inner surface of the mesh from a second perspective;
    causing a display of the first image data on a first portion of a display; and
    causing a display of at least part of the first stereoscopic image and at least part of the second stereoscopic image on a second portion of the display,
    wherein at least part of the second portion of the display surrounds the first portion of the display.

13. The non-transitory computer-readable storage medium of claim 12, wherein the display of the first and second stereoscopic images creates an illusion of depth.

14. The non-transitory computer-readable storage medium of claim 12, wherein the first image data and the first and second images are displayed on a head-mounted display.

15. The non-transitory computer-readable storage medium of claim 12, further comprising computer-executable instructions for:
    tessellating the second image data,
    wherein tessellating the second image data creates a plurality of vertices, and
    wherein the vertices are used as the sample points for generating the mesh, mapping the image data to the mesh, and generating the first and second stereoscopic images of the inner surface of the mesh.

16. The non-transitory computer-readable storage medium of claim 15, wherein the density of vertices is greater than a density of pixels of a display to be used to display the first and second stereoscopic images.

17. The non-transitory computer-readable storage medium of claim 12, further comprising computer-executable instructions for:
    determining a portion of an image represented by the second image data, wherein the obtained second image data includes only the data for the portion of the image.

18. The non-transitory computer-readable storage medium of claim 17, wherein the portion of the image is determined at least in part by the position of a head-mounted display.

19. The non-transitory computer-readable storage medium of claim 12, wherein the second image data represents an image of a scene from the perspective of a vantage point.

20. The non-transitory computer-readable storage medium of claim 19, wherein the scene is computer-generated.

21. The non-transitory computer-readable storage medium of claim 19, wherein the scene is a live scene.

22. The non-transitory computer-readable storage medium of claim 19, wherein the image of the scene includes a 360 degree view horizontally around the vantage point and a 180 degree view vertically around the vantage point.

23. A system for generating stereoscopic images, the system comprising:
a display; and
one or more processors coupled to the display and configured to:
obtain first image data;
obtain second image data comprising a plurality of sample points,
wherein a direction, a color value, and a depth value are associated with each sample point, and
wherein the directions and depth values are relative to a common origin;
generate a mesh, wherein generating the mesh includes displacing the sample points from the common origin in the directions associated with the sample points by distances representative of the corresponding depth values;
map the second image data to the mesh, wherein the color values associated with the sample points are mapped to the mesh at the corresponding directions;
generate a first stereoscopic image of an inner surface of the mesh from a first perspective;
generate a second stereoscopic image of the inner surface of the mesh from a second perspective;
cause a display of the first image data on a first portion of a display; and
cause a display of at least part of the first stereoscopic image and at least part of the second stereoscopic image on a second portion of the display,
wherein at least part of the second portion of the display surrounds the first portion of the display.

24. The system of claim 23, wherein the display of the first and second stereoscopic images creates an illusion of depth.

25. The system of claim 23, wherein the first image data and the first and second images are displayed on a head-mounted display.

26. The system of claim 23, further comprising tessellating the second image data, wherein tessellating the second image data creates a plurality of vertices, and wherein the vertices are used as the sample points for generating the mesh, mapping the image data to the mesh, and generating the first and second stereoscopic images of the inner surface of the mesh.

27. The system of claim 26, wherein the density of vertices is greater than a density of pixels of a display to be used to display the first and second stereoscopic images.

28. The system of claim 23, further comprising:
determining a portion of an image represented by the second image data, wherein the obtained second image data includes only the data for the portion of the image.

29. The system of claim 28, wherein the portion of the image is determined at least in part by the position of a head-mounted display.

30. The system of claim 23, wherein the second image data represents an image of a scene from the perspective of a vantage point.

31. The system of claim 30, wherein the scene is computer-generated.

32. The system of claim 30, wherein the scene is a live scene.

33. The system of claim 30, wherein the image of the scene includes a 360 degree view horizontally around the vantage point and a 180 degree view vertically around the vantage point.

34. The computer-implemented method of claim 1, wherein the first image data represents two-dimensional images.

* * * * *